United States Patent [19]

Johnson, Jr.

[11] Patent Number: 5,117,324

[45] Date of Patent: May 26, 1992

[54] UPS-COMPUTER SYSTEM AND METHOD FOR INITIATING COMPUTER SHUTDOWN BASED ON REMAINING BATTERY TIME AS DETERMINED FROM SENSED BATTERY VOLTAGE AND DISCHARGE CURVES

[75] Inventor: Robert W. Johnson, Jr., Raleigh, N.C.

[73] Assignee: Exide Electronics, Raleigh, N.C.

[21] Appl. No.: 434,279

[22] Filed: Nov. 13, 1989

[51] Int. Cl.⁵ .................. H02H 3/24; H02H 7/20; H02J 7/00
[52] U.S. Cl. .................. 361/66; 307/66; 365/229; 371/66
[58] Field of Search .................. 361/64, 66; 307/23, 307/29, 38, 39, 64, 66, 85–87; 365/227–229; 371/66

[56] References Cited

U.S. PATENT DOCUMENTS

| | | | |
|---|---|---|---|
| 4,611,289 | 9/1986 | Coppola | 371/66 |
| 4,675,538 | 6/1987 | Epstein | 307/64 |
| 4,757,505 | 7/1988 | Marrington et al. | 371/66 |

Primary Examiner—A. D. Pellinen
Assistant Examiner—Richard Elms
Attorney, Agent, or Firm—Woodcock Washburn Kurtz Mackiewicz & Norris

[57] ABSTRACT

Method and apparatus for providing protected power to a computer. A computer monitors the terminal voltage and/or current of a battery supplying power to the computer and uses this information or data to determine when, in the event of failure of the AC utility normally supplying power to the computer, to initiate a pre-programmed automatic shutdown of the computer. The determination is based upon the estimated remaining charge of the battery and the total time required to close all active programs in an orderly fashion; thus allowing the computer to be restarted in a well-defined state.

10 Claims, 3 Drawing Sheets

UPS-COMPUTER SYSTEM AND METHOD FOR INITIATING COMPUTER SHUTDOWN BASED ON REMAINING BATTERY TIME AS DETERMINED FROM SENSED BATTERY VOLTAGE AND DISCHARGE CURVES

FIELD OF THE INVENTION

This invention relates to electronic computer systems. More particularly the present invention relates to, to an uninterruptable power supply (UPS)-computer system that supplies power to a computer during main power source interruption and controls the sequencing of the computer during automatic shutdown and automatic restart after such an interruption and to a method of powering and controlling a computer.

BACKGROUND OF THE INVENTION

The wide spread use of computers has resulted in many tasks that are automatically controlled, with unattended processing performed by the computer. In the event of utility or power system failure, it is desirable that the operating program of the computer be logically closed and the point of interruption in the program flow be recorded. Data being processed in the computer, at the time of power system interruption, should be stored so that a resumption of processing can take place when the utility returns. For example, if the power fails without any prior provision for orderly shutdown, the computer may be in the process of transmission of information to peripheral devices (e.g., a disk, printer etc.) at the moment failure occurs. The operator cannot be certain of how much of the information was transmitted successfully, and whether electrical irregularities, such as spikes, during failure may have altered the information. The operator cannot conveniently reconstruct the failure to determine whether the information transmitted to the peripheral device is correct and reliable. The status of the computer is therefore poorly defined, and the operator cannot be certain what would happen if he simply restarted the computer and hoped that it would restart at the point of interruption without losing information. The operator then can choose to gamble on an orderly restart or begin the entire computing operation over, if that is possible under the circumstances.

Major power losses are relatively rare in most places. Unfortunately, computers are typically sensitive to brief power failures lasting only a fraction of a second and to partial power failures that reduce the main power line voltage below the design limits of the computer. The computer may be vulnerable to power losses and fluctuations that are not even noticeable to a person who is watching the computer, since they may not significantly effect many other types of electrical devices. Both major and minor power losses can interrupt normal computer operations in a way that makes reconstruction and restoration of the computer's status nearly impossible, because it is difficult to determine the exact time, status, and failure sequence of the computer when the power loss occurred.

As a response to the extreme sensitivity of computer systems to electrical interruptions, uninterruptable power supplies (UPSs) have been developed for nearly all types of computers. For example, see, U.S. Pat. No. 4,757,505—Marrington et al., (Marrington or the '505). Marrington discloses a backup computer power system for powering and controlling a computer which is otherwise powered by a main power source, when then main power source fails or is disconnected.

The '505 patent discloses an auxiliary power supply for providing power to a computer. An instruction set residing in the computer controllably shuts down the computer after first allowing optional operator intervention prior to initiation of the programmed shutdown. The automatic shutdown of the computer is triggered by a signal from a status monitor when main or utility power fails. When the main power fails, a relay is actuated and the computer is connected to a battery. If the operator does not intervene within a predefined period of time (e.g., 5 minutes), the instruction set terminates the current activity of the computer, saves the software operating environment of the computer, and shuts down the computer.

A significant short-coming with the prior art system of the type described above is that the time during which the computer is allowed to operate, on battery power after a main power failure, is not maximized. In other words, absent restoration of the main power, the computer will automatically shut down regardless of the useful lifetime remaining in the battery. In many situations it would be desireable to allow the computer to continue processing information for as long as possible before the battery is depleted beyond the point at which an orderly shutdown could be achieved.

Thus, a primary object of the present invention is to provide a UPS-computer system in which the battery voltage can be observed during normal and emergency operation and can provide information that is useful in determining when to initiate an orderly shutdown of the computer.

SUMMARY OF THE INVENTION

The preferred embodiment of the present invention provides an uninterruptable power supply system for powering a computer. The system comprises: an auxiliary power source including a battery; sensing means for sensing the battery data; communication means for communicating the battery data from the sensing means to the computer; instruction means stored in the computer comprising code for determining when, based on the battery data to initiate a programmed shutdown sequence of the computer, and for automatically executing the programmed shutdown sequence.

In accordance with another aspect of the invention, a method is provided of powering and controlling a computer which is otherwise powered by an AC utility power source, when the AC utility power source fails or is disconnected from the computer. The method comprises: a) supplying an auxiliary power source including a battery; b) sensing data from the battery; c) communicating the battery data to the computer; d) determining when, based on said battery data, to initiate a programmed shutdown sequence of said computer; and e) executing the shut down sequence. The preferred embodiment further comprises means for transmitting protected power (i.e., the utility or battery power) from the auxiliary power source to the computer.

In the most preferred embodiment the battery data comprises the terminal voltage and current of the battery. The most preferred embodiment further comprises code for: determining when, based on the battery data, to initiate a programmed restart sequence of the computer, and for automatically executing the programmed restart sequence.

DETAILED DESCRIPTION OF THE PREFERRED EMBODIMENT

Figure 1:
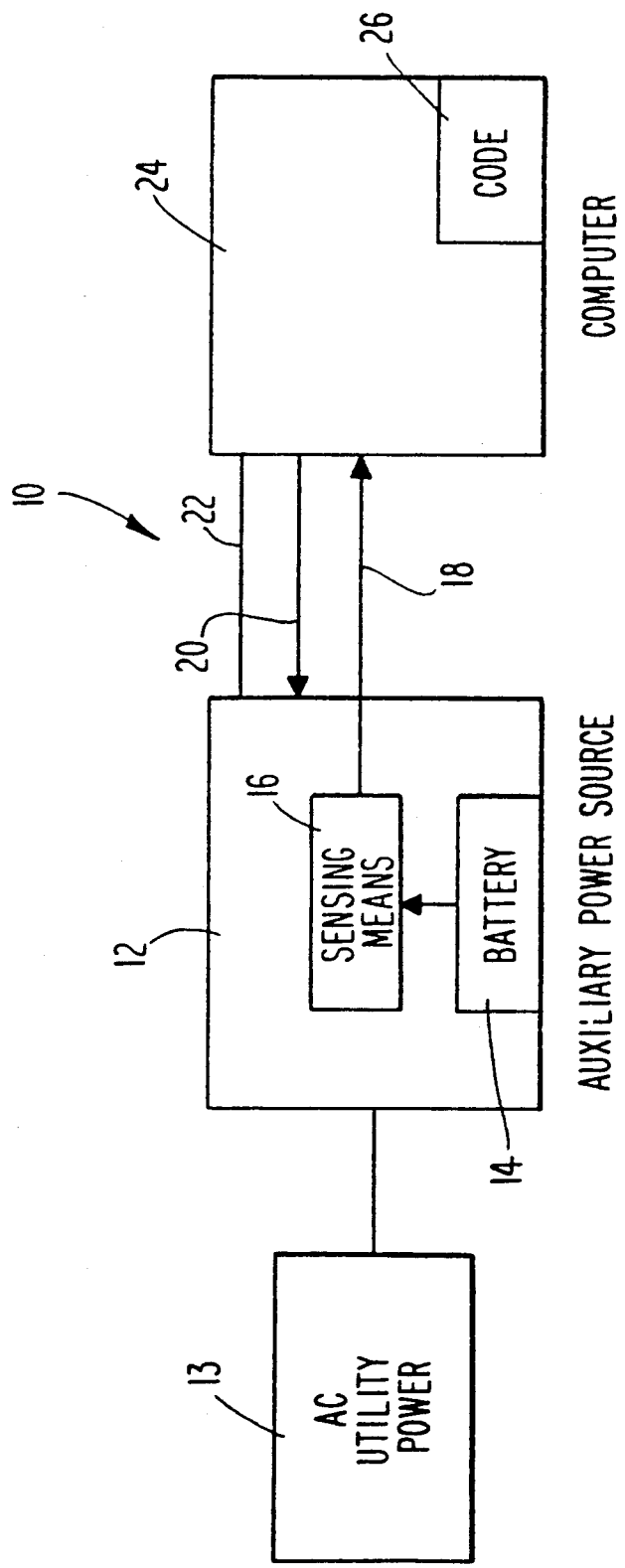
FIG. 1 is a block diagram of a UPS-computer system according to the present invention.

Referring now to FIG. 1, therein is depicted a UPS-computer system shown generally at 10 according to the present invention. In accordance with the present invention, the preferred embodiment comprises an UPS or auxiliary power source 12 coupled to an AC utility power source 13. The power source 12 includes a battery 14, operatively connected to sensing means 16 for sensing the battery's terminal voltage. The sensing means 16 may also include, if desired, a current sensing device. The battery terminal voltage (and/or current) is communicated to a computer 24 via communication line 18. In the computer 24 is stored instruction means or code 26 which will automatically trigger and accomplish the orderly shutdown of the computer when the battery terminal voltage falls below a predefined level. A second communication line 20 is provided for the transmission of control signals from the computer to the UPS or auxiliary power supply 12 for disconnecting the battery 14 from the computer 24 once the computer has been successfully shut down. Power line 22 provides means for transmitting the protected power from the auxiliary power supply to the computer 24.

Figure 2:
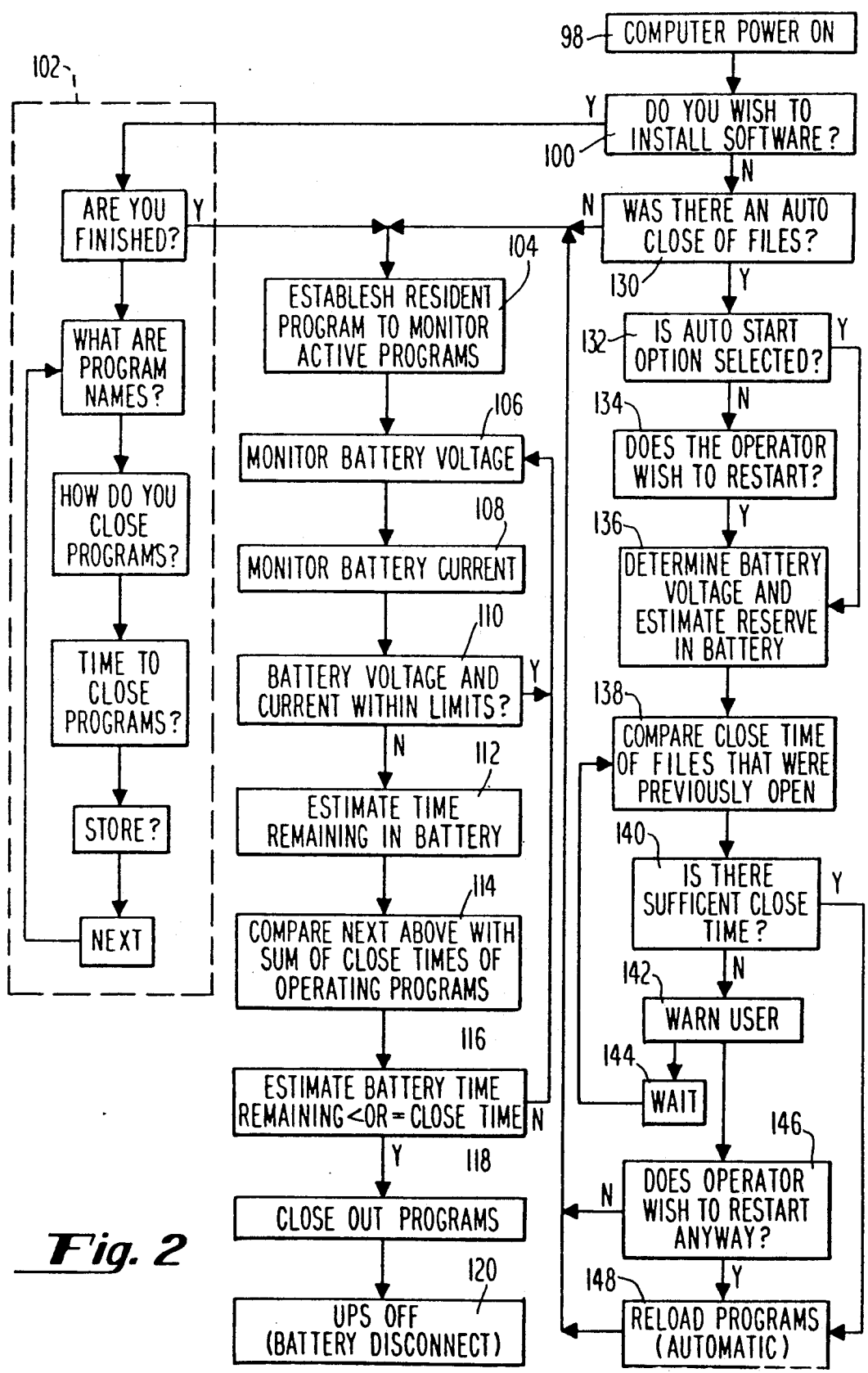
FIG. 2 is a flow chart of a method of operating a UPS-computer system according to the present invention.
Figure 3:
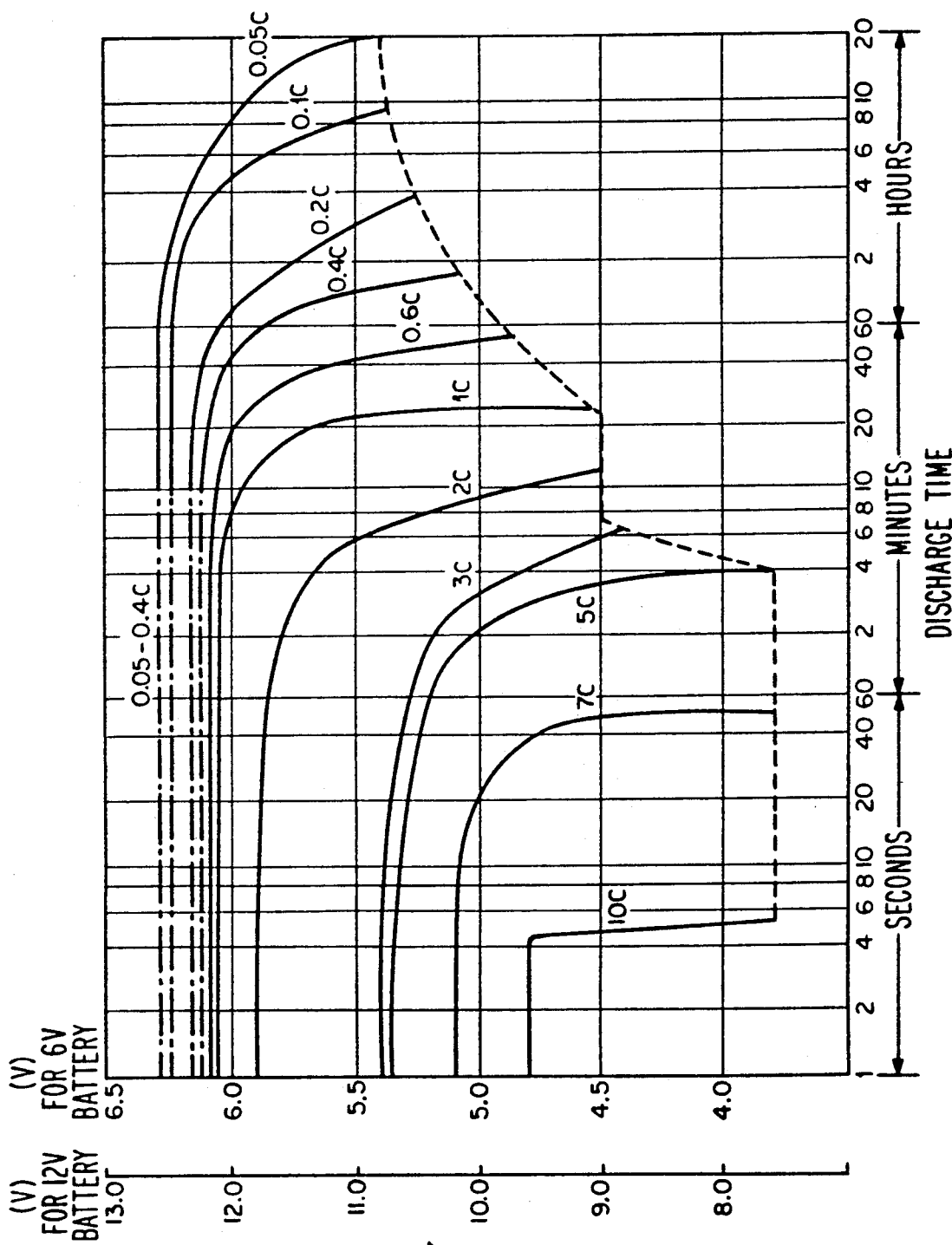
FIG. 3 illustrates discharge characteristics curves at 20° C. (68° F.) for 6 V and 12 volt batteries.

Referring now to FIG. 2, therein is depicted a flow chart of a preferred method of operating a UPS-computer system according to the present invention. As used hereinafter the reference numerals refer to the blocks illustrated in the flow chart of FIG. 2. After being powered on 98, the computer 24 first inquires whether the user wishes to install software 100. If the answer is yes (Y), the software installation process is performed as depicted in the dashed line block labeled 102. Most preferably, during the software installation process 102, the computer determines from the user or operator the names of the resident programs which the computer will be running, the method of closing the programs, the time required to close these programs, and what items of information should be stored in the event of an orderly computer shutdown. Next, the resident programs which the computer is required to run are established or activated 104. Next, battery terminal voltage, as sensed by sensing means 16, is monitored 106. At the same time, the battery terminal current can be monitored 108. Next, the computer checks to see if the current and voltage, or battery data, are within predefined limits 110. If they are (Y), the computer simply continues to monitor the battery's voltage and/or current while the resident programs are running. If the current and voltage of the battery 14 are not within the predefined limits i.e., (N), the computer calculates the estimated remaining useful life of the battery 112. This calculation is based upon a predetermined equation. The calculation to estimate the time remaining is based on the Battery Discharge Curves that are provided by the battery manufacturer. A sample of such discharge curves are shown in FIG. 3. The curve or family of curves are provided for lead acid type batteries and are shown for various discharge rates. The discharge curves are marked in some factor of "C" or Capacity of the battery in ampere hours (Ahrs). For example, a 10 Ahr battery that is discharged at the 3C rate is discharged at 30 Amperes. The start of discharge will cause the battery voltage to drop from the open circuit value to a voltage that is on the discharge curves. As time passes, the change in battery voltage is continually monitored and from the slope of this battery voltage, the appropriate discharge curve can be selected. When the battery voltage is compared to the expected discharge curve from the battery manufacturer, an estimate of the time remaining can be provided since the voltage at which the battery is considered discharged is known (this is also determined for the battery discharge curves—the dashed line shown in FIG. 3). If the battery current or estimate of it can be determined, the accuracy of the time remaining estimate can be improved. The battery voltage will continue to follow the selected curve or based on the battery voltage monitoring select a new curve and from this curve the time remaining can be determined. It is important to note that the quality of the estimate improves as the discharge of the battery proceeds. The slope of the falling battery voltage increases with time which tends to make the estimate more accurate. The estimated remaining life of the battery is then compared with the sum of the close times of all active resident programs 114. Note that the close times were defined during software installation at 102. When the difference between the estimated remaining lifetime of the battery and the sum of the close times of the active programs drops below a predefined value 116 i.e., is less than or equal to the required time to close out the running programs (Y), the computer automatically closes out all programs 118. The exact closing sequence or sequences are defined during the software installation at 102. Next, the battery is disconnected from the computer to avoid wasting energy 120.

If, at 100, the user chooses to forego software installation (N), the computer checks to see whether there was an auto-close of files performed 130. If not (N), the computer proceeds to 104 and proceeds as described above. If there was an auto-close (Y), the computer checks to see whether an auto-restart option was selected 132 (i.e., was chosen by the user during software installation). If the auto-restart option was selected, the computer proceeds to step 136. If auto-restart was not selected (N), the computer asks the operator whether he wishes to restart the computer 134. If not, no further action is taken.

If the operator chooses to restart (Y), or if the auto-restart option is selected, the computer next determines the battery voltage and current and estimates the reserve charge in the battery 136. The estimated reserve time (i.e., remaining lifetime) of the battery is compared with the close times of files that were previously active and that would need to be restarted 138. The computer next performs a calculation to determine if there is sufficient time to close all files in the event of another power failure 140. The calculation of the time to close all files can be determined by knowing the method of storage (i.e., hard disk or floppy disk) for the files, knowing the disk transfer rate, the number of files open, and the time required by the program to secure the memory of the computer. If not (N), a warning is issued to the user 142, the computer goes into a wait state for a predefined period of time 144, and loops back to 138 and proceeds as described above until there is sufficient time remaining in the battery to close all files which would be restarted 140, or the user elects to go ahead and restart anyway 146. The computer then automatically reloads the programs 148 which were running when the computer was turned off 120. The programs are reloaded according to a sequence defined during software installation 102. The computer then proceeds to 104 and continues therefrom as described above.

From the foregoing, it will be understood that in accordance with the present invention, battery voltage can be observed during normal and emergency operation and can provide information that is useful in triggering the termination of programs in progress. By monitoring the battery terminal voltage changes during the discharge process, the point of battery exhaustion can be estimated. An orderly shutdown can and should be initiated before the battery is discharged to the point where its remaining life is just long enough for an orderly shutdown, depending upon what resident programs are active at the time. This mode of operation permits automatic shutdown without the nuisance shutdowns that may occur on brief power outages when triggered by utility failures only. In addition, monitoring battery voltage allows control of the computer operating time automatically in event of multiple utility failures occurring before the battery has fully recharged. At the time of installation, the time for orderly shutdown can be determined for each program. In the case of multiple programs operating, the software will estimate the close time for all open or active programs and warn the user in the event more programs are open than can be closed within the remaining lifetime of the battery. An enhancement would consider the battery current in addition to, and in combination with, the battery voltage to trigger automatic shutdown and/or warn the user of UPS's capability of protection.

In the preferred embodiment described, the program will preferably be supplied in two user selectable versions. The first is full automatic operation without user intervention that is initiated when the battery's charge falls to the minimum required to complete an orderly shutdown sequence. The second is manual operator initiation of the shutdown, where the operator is given warnings by way of on-screen or audible signals that the time to complete an orderly shutdown has arrived. An additional feature is user selectable such that the programs will not automatically reload until sufficient reserve has been accumulated in the battery to complete an orderly shutdown of the programs in the event that another power failure occurs.

Although particular embodiments of the invention have been described in detail for purposes of illustration, various modifications may be made without departing from the spirit and scope of the invention. Accordingly, the invention is not to be limited except as by the appended claims.

What is claimed is:

1. An uninterruptable power supply system for powering a computer having a shutdown sequence, wherein the time required to execute said shutdown sequence is known and stored in said computer, comprising:
   an auxiliary power source including a battery for supplying power to the computer, said battery having known discharge characteristic curves, said discharge characteristic curves stored in said computer;
   sensing means, connected between said battery and said computer, for sensing battery terminal voltage and transmitting the sensed terminal voltage to said computer; and
   instruction means, stored in said computer, for determining whether said terminal voltage is within predefined limits, for determining battery time remaining in response to the sensed battery terminal voltage, for comparing said battery time remaining to said time required to execute said shutdown sequence and for initiating said shutdown sequence whenever said battery time remaining is less than or equal to said time required to execute said shutdown sequence, wherein said battery time remaining is determined from said discharge characteristic curves in relation to said battery terminal voltage after it is determined that said terminal voltage is not within said predefined limits, whereby computer operating time is maximized.

2. An uninterruptable power supply system according to claim 1 further comprising:
   communication means for both
   (i) communicating control signals from the computer to the auxiliary power source and,
   (ii) disconnecting the battery from the computer once the computer has been shutdown.

3. An uninterruptable power supply system according to claim 1 further comprising:
   transmitting means for transmitting protected power from the auxiliary power source to the computer.

4. An uninterruptable power supply system according to claim 1 wherein said instruction means further comprises code for
   determining when, based on said sensed battery terminal voltage, to initiate a programmed restart sequence of said computer, wherein the determination to initiate a programmed restart sequence is made by determining battery time remaining in response to the sensed battery terminal voltage, wherein said battery time remaining is determined from said discharge characteristic curves and by comparing said battery time remaining to said time required to execute said shutdown sequence; and
   automatically executing the programmed restart sequence after it is determined that said battery time remaining exceeds said time required to execute said shutdown sequence.

5. A method of powering a computer when the AC utility power source, which otherwise powers said computer, fails or is disconnected from the computer, wherein said computer has a shutdown sequence and wherein the time required to execute said shutdown sequence is known and stored in said computer, said method comprising the steps of:
   supplying power to the computer from an auxiliary power source including a battery, said battery having known discharge characteristic curves, said discharge characteristic curves stored in said computer;
   sensing battery terminal voltage;
   determining whether said battery terminal voltage is within predefined limits;
   determining battery time remaining in response to the sensed battery terminal voltage, wherein said battery time remaining is determined from said discharge characteristic curves in relation to said battery terminal voltage after it is determined that said terminal voltage is not within said predefined limits;

comparing said battery time remaining to said time required to execute said shutdown sequence; and initiating said shutdown sequence whenever said battery time remaining is less than or equal to said time required to execute said shutdown sequence, whereby computer operating time is maximized.

6. A method according to claim 5 further comprising the steps of:

communicating control signals from said computer to said auxiliary power source; and disconnecting said battery from the computer once said computer has been shutdown.

7. A method according to claim 5 further comprising the steps of determining when, based on said sensed battery terminal voltage, to initiate a programmed restart sequence of said computer, wherein the determination to initiate a programmed restart sequence is made by determining battery time remaining in response to the sensed battery terminal voltage, wherein said battery time remaining is determined from said discharge characteristic curves and by comparing said battery time remaining to said time required to execute said shutdown sequence; and executing the programmed restart sequence after it is determined that said battery time remaining exceeds said time required to execute said shutdown sequence.

8. A method according to claim 7 wherein said step of executing the programmed restart sequence is automatically effected by said computer.

9. A method according to claim 5, wherein said discharge characteristic curves each comprise a slope and wherein said step of determining battery time remaining from said discharge characteristic curves comprises the steps of determining the slope of said battery terminal voltage and comparing the battery terminal voltage slope to the slope of said discharge characteristic curves.

10. The method of claim 5, wherein a plurality of program are stored in said computer, each program having a close time, said method further comprising the step of determining said time required to execute said shutdown sequence by determining the sum of the closing times.

* * * * *